(12) United States Patent
Gao et al.

(10) Patent No.: US 7,390,762 B2
(45) Date of Patent: Jun. 24, 2008

(54) METHOD FOR THE PREPARATION OF HIGH-CONTENT NAY MOLECULAR SIEVES SYNTHESIZED FROM KAOLIN SPRAYED MICROSPHERES

(75) Inventors: Xionghou Gao, Beijing (CN); Honghai Liu, Beijing (CN); Baojie Wang, Beijing (CN); Changyan Duan, Beijing (CN); Xinmei Pang, Beijing (CN); Li Zhang, Beijing (CN); Lianhong Zhao, Beijing (CN); Jiangang Ma, Beijing (CN); Yunheng Liu, Beijing (CN)

(73) Assignee: PetroChina Company Limited, Beijing (CN)

( * ) Notice: Subject to any disclaimer, the term of this patent is extended or adjusted under 35 U.S.C. 154(b) by 274 days.

(21) Appl. No.: 11/287,415

(22) Filed: Nov. 23, 2005

(65) Prior Publication Data

US 2006/0116277 A1 Jun. 1, 2006

(30) Foreign Application Priority Data

Nov. 26, 2004 (CN) .................... 2004 1 0091494

(51) Int. Cl.
*B01J 29/04* (2006.01)
*B01J 29/08* (2006.01)
(52) U.S. Cl. .............. 502/60; 502/63; 502/64; 502/68; 502/70; 502/79
(58) Field of Classification Search ........... 502/60, 502/63, 64, 68, 70, 79
See application file for complete search history.

(56) References Cited

U.S. PATENT DOCUMENTS

| 3,367,886 | A |   | 2/1968 | Haden, Jr. et al. |
| 3,367,887 | A |   | 2/1968 | Haden, Jr. et al. |
| 3,377,006 | A |   | 4/1968 | Bahm |
| 3,503,900 | A |   | 3/1970 | Haden, Jr. et al. |
| 3,506,594 | A |   | 4/1970 | Haden, Jr. et al. |
| 3,647,718 | A |   | 3/1972 | Haden, Jr. et al. |
| 3,657,154 | A |   | 4/1972 | Haden, Jr. et al. |
| 3,663,165 | A |   | 5/1972 | Haden, Jr. et al. |
| 3,932,268 | A |   | 1/1976 | Haden, Jr. et al. |
| 4,493,902 | A |   | 1/1985 | Brown et al. |
| 5,384,041 | A | * | 1/1995 | Deeba et al. ............ 208/253 |

FOREIGN PATENT DOCUMENTS

| CN | 1081425 A | 2/1994 |
| CN | 1180045 A | 4/1998 |
| CN | 1232862   | 10/1999 |
| CN | 1429883 A | 7/2003 |
| EP | 369629    | 5/1990 |
| GB | 1271450   | 4/1972 |

\* cited by examiner

*Primary Examiner*—Elizabeth D Wood
(74) *Attorney, Agent, or Firm*—Jon L. Woodard; Edward W. Goebel, Jr.; MacDonald Illig Jones & Britton LLP

(57) ABSTRACT

A method for synthesizing high-content NaY molecular sieves with kaolin sprayed microspheres includes adding functional components and deionized water into kaolin so as to be pulped into a mixed slurry. The slurry is sprayed into microspheres. The microspheres are calcined at a temperature between 700 and 1,000° C. and mixed with a directing agent for crystallization. The resultant solid is filtrated and washed with water and then dried to obtain a final in-situ crystallized product with high content of molecular sieves.

26 Claims, 2 Drawing Sheets

METHOD FOR THE PREPARATION OF HIGH-CONTENT NAY MOLECULAR SIEVES SYNTHESIZED FROM KAOLIN SPRAYED MICROSPHERES

TECHNICAL FIELD OF THE INVENTION

This invention relates to a method for preparing oil refining catalyst, and more specifically to a method for preparing high content NaY molecular sieves synthesized from kaolin sprayed microspheres. The method involves using kaolin sprayed microspheres as a raw material to synthesize NaY molecular sieves by in-situ crystallization. The crystallized product synthesized by this method can be used as the precursor for the preparation of catalytic cracking catalysts.

TECHNICAL BACKGROUND OF THE INVENTION

NaY molecular sieves are generally synthesized from an alkaline silicon-aluminum gel system. The raw materials are generally water glass, aluminum sulfate, sodium meta-aluminate, and a directing agent. The molecular sieves synthesized with these materials are characterized by a high content of molecular sieves and a high silicon/aluminum ratio. Different modification methods enable such molecular sieves to have diversified reaction characteristics. NaY molecular sieves are the major source of the active components in the field of catalytic cracking.

A new NaY molecular sieve synthesis method, referred to as the kaolin in-situ crystallization method, was first developed in the 1970s. The in-situ crystallization zeolite technologies disclosed by U.S. Pat. Nos. 3,506,594, 3,503,900, and 3,647,718 take kaolin as a raw material for simultaneous preparation of active component and matrix, wherein FCC catalysts obtained by in-situ crystallization are called kaolin-based catalysts. The main preparation process thereof involves spraying kaolin into microspheres fit for a Fluidized Catalytic Cracking (FCC) unit. After the microspheres undergo calcinations, a portion of the microspheres are subsequently transformed into NaY molecular sieves in alkali system, and then, after modification, are prepared into FCC catalyst.

Compared to FCC catalyst prepared by semi-synthesis technology with gel-synthesized Y-type molecular sieves as active component, kaolin-based FCC catalysts have an advantage of stronger resistance to heavy metal, higher activity, excellent hydrothermal stability, and structural stability.

In the early phase, meta-kaolin microspheres are generally used for synthesizing NaY molecular sieves. United Kingdom Document UK1271450 discloses kaolin calcined into meta-kaolin at temperature of below 704° C. and then reacted with sodium silicate to synthesize Y zeolite. U.S. Pat. No. 3,377,006 discloses the synthesis of Y zeolite with specially fine meta kaolin powder.

U.S. Pat. Nos. 3,367,886, 3,367,887, 3,506,594, 3,647,718, 3,657,154, 3,663,165, and 3,932,268 disclose that, in in-situ crystallized products prepared with kaolin calcined at high temperatures above 900° C. (hereafter referred to as "kaolin calcined"), Y zeolite has a high ratio of silicon to aluminum, but crystallinity is less than 30%, and generally in the range of between 20% and 30%.

U.S. Pat. No. 4,493,902 discloses a process for the production of a crystallized product with high content of zeolite using microspheres with the coexistence of meta kaolin, kaolin calcined and crystal seeds in a same microsphere. The crystallinity of the crystallized product is greater than 40%. However, the disclosed process places substantial requirements on the raw materials used for spray shaping in that such raw materials should be super fine kaolin calcined Satone No. 2 and super fine raw kaolin clay ASP-600. Such super fine materials are very expensive and are difficult to obtain from commercial sources.

European Document EP369629 discloses increasing microsphere pore volume by increasing fine powder kaolin calcined, so as to increase the zeolite content in the microsphere. The disclosed process can increase the crystallinity of products to 70%. However, such super fine powder of kaolin calcined is very expensive. In addition, substantial amounts of kaolin calcined with low adhesive property are present in the sprayed microspheres, resulting in microspheres of poor attrition resistance.

Peoples Republic of China Document CN1232862 discloses a method for the preparation of high-content in-situ crystallized molecular sieve. Pore structure of the crystallized product prepared by the disclosed method is not ideal and adversely affects the selectivity for heavy oil and coke.

Peoples Republic of China Document CN1429883 discloses a preparation method of in-situ crystallized product with high content of molecular sieves possessing strong resistance to heavy metals. The specific surface areas of the disclosed examples show that the method fails to achieve the objective of increasing molecular sieve content in the crystallized products.

SUMMARY OF THE INVENTION

The invention provides crystallized products with high content of zeolite by in-situ crystallization process using kaolin sprayed microspheres as raw materials. A method for the preparation of high-content NaY molecular sieves synthesized from kaolin sprayed microspheres includes the adding of functional components and deionized water into kaolin clay so as to be pulped into mixed slurry. The functional components are structural additives in an amount of about 2 to 10 percent by mass of kaolin. The structural additives comprise one or more of starch, graphite powder, and carboxymenthyl cellulose(s).

The mixed slurry is sprayed and dried to produce kaolin sprayed microspheres. The kaolin sprayed microspheres are calcined and mixed with directing agent for crystallization. The resulting solid products are collected by filtration and further washed with deionized water and dried to obtain a final in-situ crystallized product with high content of molecular sieves.

The solid content of kaolin in the mixed slurry is in most embodiments about 30 to 50 weight %, and the particle diameter of the kaolin sprayed microspheres obtained by spraying and drying is about 20 to 110 μm.

The functional components most often also include at least one bonding agent and mineralizer. The kaolin can include soft kaolin, hard kaolin and coal gangue in the median diameter of about 2.3 to 3.5 μm, with more than 80 wt % of crystal kaolin, less than 1.7 wt % of ferric oxide, and less than 0.5 wt % of the total of sodium oxide and potassium oxide.

Bonding agents can include sodium silicate, silica sol, aluminum sol, pseudoboehmite and the mixture thereof in an amount of about 5 to 17% based on the mass of the kaolin.

The mineralizer can include sodium hydroxide in an amount of about 1 to 1.5% based on the mass of the kaolin.

One or more directing agents that are used in the invention can have a mole ratio of $(14-16)SiO_2:(0.7-1.3)Al_2O_3:(14-16)Na_2O:(300-330)H_2O$.

In one method according to the invention, Kaolin is sprayed into microspheres, after which the microspheres undergo calcination at temperatures between 700 and 1000 C for about 1 to 3 hours. Sodium silicate, directing agent, sodium hydroxide solution and deionized water are subsequently added to form a solid-liquid mixture. The obtained mixture is crystallized at about 90 to 95° C. for about 16 to 36 hours. The resultant solid is then filtrated to remove the mother liquid and washed with deionized water until the pH less than 10.5, and dried so as to obtain an in-situ crystallized product of kaolin microspheres containing about 40 to 60 wt % of NaY molecular sieves.

Alternatively, one method according to the invention includes having a portion of kaolin microspheres undergo calcination at a temperature between about 920 and 1000° C. for about 1 to 3 hours to yield high-temperature calcined kaolin microspheres. Another portion of the kaolin microspheres is calcined at a temperature between about 700 and 900° C. for about 1 to 3 hours to yield meta kaolin microspheres. Both portions of the kaolin are then mixed, and sodium silicate, directing agent, sodium hydroxide solution and deionized water are subsequently added to form a solid-liquid mixture. The obtained mixture is crystallized at about 90 to 95° C. for about 16 to 36 hours. The resultant solid products are filtrated to remove the mother liquid, washed with deionized water until the pH reaches less than 10.5, and dried so as to obtain an in-situ crystallized product of kaolin microspheres containing about 40 to 60 wt % of NaY molecular sieves, the ratio of silicon to aluminum therein being about 3.5 to 5.5.

Those skilled in the art will realize that this invention is capable of embodiments different from those shown and that details of the invention described herein can be changed in various manners without departing from the scope of this invention. Accordingly, the drawings and descriptions are to be regarded as including such equivalent compositions and arrangements as do not depart from the spirit and scope of this invention.

BRIEF DESCRIPTION OF THE DRAWINGS

FIG. 2 shows that the two products have the same XRD patterns.

DETAILED DESCRIPTION OF THE INVENTION

Figure 1:
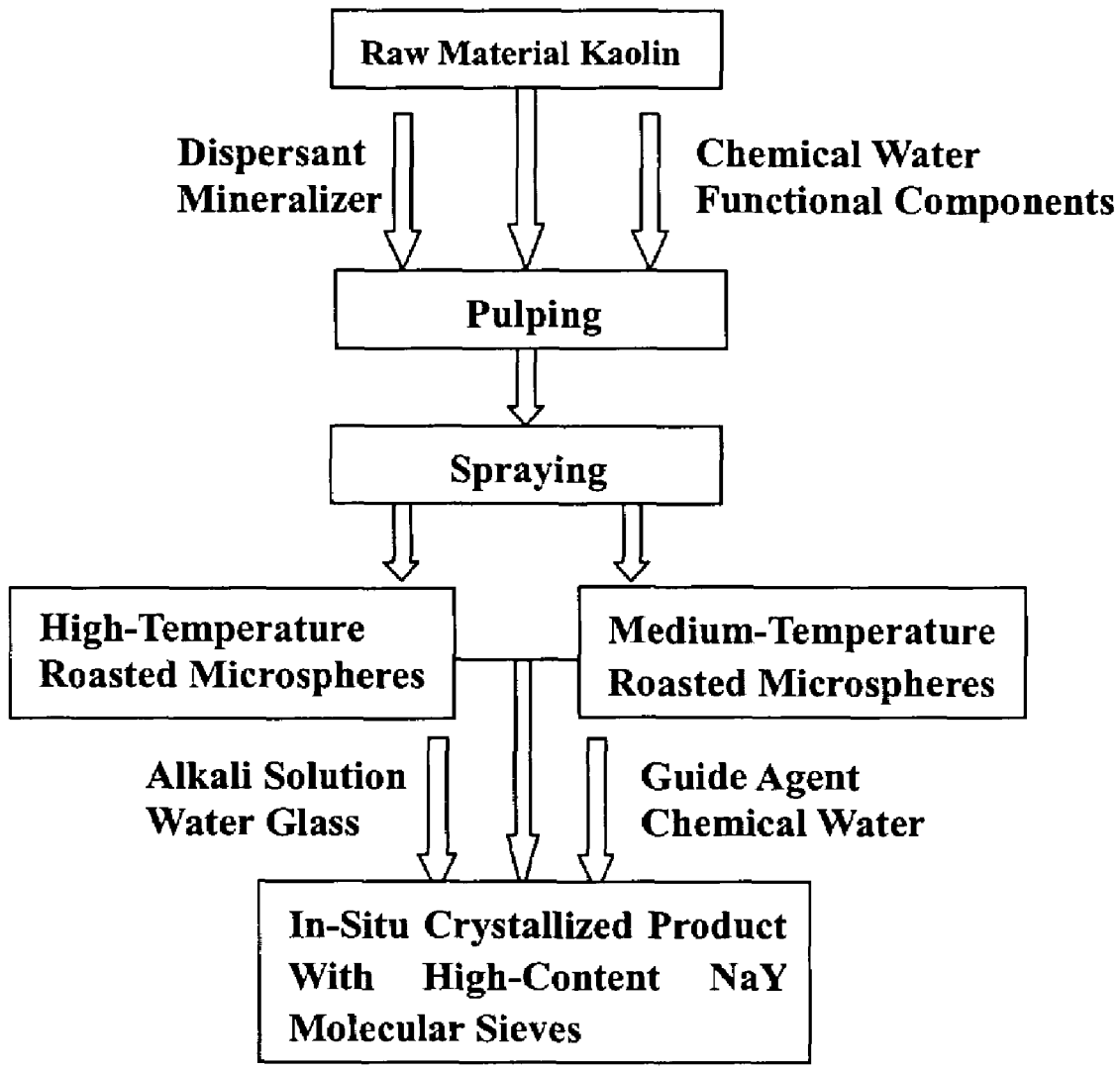
FIG. 1 is a flow process chart for the preparation of in-situ crystallized product with high-content zeolite.

According to one contemplated method of the invention, deionized water is added into raw kaolin clay, mixed and pulped into a slurry. Functional components, also called additives, which include bonding agent, mineralizer, dispersant, structural agent, are then added. The bonding agent and mineralizer can be any well-known additives. For example, the bonding agent can be sodium silicate, silicate sol, aluminum sol, pseudoboehmite or the mixture thereof, with the addition of the bonding agent being at an amount of 5 to 17 percent by mass of the kaolin. The bonding agents mainly function to promote the attrition resistance of the catalyst, and some can simultaneously act as dispersant. The mineralizer, in an amount of 1 to 1.5 percent by mass of the kaolin, comprises sodium hydroxide, and mainly functions to promote calcining effect of the sprayed microspheres. The structural agent in an amount of 2 to 10 percent by mass of the kaolin includes starch, graphite powder, carboxymethyl cellulose and mixtures thereof. The structural agent mainly functions to improve the pore structures of the kaolin sprayed microspheres. The $Na_2O$, $Al_2O_3$, $SiO_2$ and the like in aforementioned additives also contribute to the in-situ crystallizing reaction. The kaolin clay includes soft kaolin, hard kaolin and coal gangue, of which the median diameter is about 2.3 to 3.5 μm. The content of the crystal kaolin is greater than 80 wt %, ferric oxide is present in an amount of less than 1.7 wt %, and the total of sodium oxide and potassium oxide is less than 0.5 wt %.

The additives and kaolin slurry are mixed so as to be prepared into a mixed slurry with about 30 to 50 wt % of the solid. Upon spraying and drying, sprayed microspheres (abbreviated as SM) with particle sizes from 20 to 110 microns are obtained. The SMs are calcined at about 700 to 1000° C. for about 1 to 3 hours. Sodium silicate, directing agent, sodium hydroxide solution, and deionized water are then added. The obtained solid-liquid mixture is crystallized at about 90 to 95° C. for about 16 to 36 hours. The resultant solid product is then filtrated to remove the mother liquid and the filtrated solid products are further washed by deionized water until the pH is less than 10.5. After drying, an in-situ crystallized product of kaolin microspheres containing about 40 to 60 wt % NaY molecular sieves can be obtained.

The SMs can be alternatively divided into two parts, one part of the SMs being calcined at temperature between about 920 and 1000° C. for about 1 to 3 hours to yield high-temperature calcined kaolin microspheres (abbreviated as SC), and the other part of the SMs being calcined at a temperature between about 700 and 900° C. for about 1 to 3 hours to yield meta kaolin microspheres (abbreviated as SP).

The sodium silicate, directing agent, sodium hydroxide solution, and deionized water are added into SC and/or SP. The directing agents according to the present invention are not specifically limited, and it will be appreciated that various directing agents well known in the art can serve this purpose within the intended scope of the invention. For example, the directing agent can include the composition denoted by: $(14-16)SiO_2:(0.7-1.3)Al_2O_3:(14-16)Na_2O:(300-330)H_2O$ (mole ratio). The concentration of sodium hydroxide in this invention is about 14 to 18 wt %, and that of sodium silicate is about 15 to 25 wt %. The aforementioned reactants are crystallized at about 90 to 95° C. for about 16 to 36 hours, the resultant solid products are filtrated to remove the mother liquid and the filtrated solid products are washed with deionized water until the pH is less than 10.5. After drying, an in-situ crystallized product of kaolin microspheres containing about 40 to 60 wt % of NaY molecular sieves and the ratio of silicon to aluminum being about 3.5 to 5.5 is obtained.

The invention utilizes the addition of additives including starch, graphite powder, carboxymethyl cellulose or their mixture for adjusting the pore structures of the kaolin microspheres. Functionally, such addition allows the starch, graphite powder and carboxymethyl cellulose to react with oxygen at high temperatures, leading to the generation of certain gases. As the gas escapes, the gas helps to form abundant pores in the calcined microspheres so as to promote the pore structures of the microspheres. The addition of the additives to adjust the pore structure of the kaolin microspheres is about 2 to 10 percent by mass of the kaolin, and preferably about 3 to 8%. Excessive additive addition can cause the structure to collapse, while insufficient additive addition can lead to limited promotion of pore structure, limiting the effectiveness of the additive addition.

It will be appreciated that the present invention increases the content of molecular sieves in kaolin in-situ crystallized product and simultaneously promotes the pore structure of the catalyst. Accordingly, it becomes predictable that high performance catalytic cracking catalysts with can be prepared with the crystallized product.

In light of the problems existing in preparation of high-content molecular sieve crystallized product with the raw material of kaolin by in-situ crystallization technology, the present invention not only provides a crystallized product with high-content molecular sieves, but also promotes the pore structure of the catalyst through the addition of some structural additives in pulping of kaolin clay. This can potentially allow for the preparation of high performance catalytic cracking catalysts.

The following detailed descriptions of example embodiments are discussed with reference to the drawings, the example embodiments being generally illustrative of unlimited further embodiments contemplated to be within the scope of the present invention.

Example specifications and suppliers of suitable raw materials that can used according to this invention include:

Kaolin: Suzhou S-1 kaolin, produced by China Kaolin Inc.; the median diameter is 3.2 μm; the contents of the crystallized kaolin and ferric oxide are respectively 82% and 0.74%; and the sum of sodium oxide and potassium is 0.35%.

Sodium silicate: $SiO_2$ 250 g/L, $Na_2O$ 88 g/L, manufactured by Lanzhou Petrochemical Co.

Silica sol: $SiO_2$ 23.5%, manufactured by Lanzhou Petrochemical Co.

Pseudoboehmite: industrial product, produced by Shandong Aluminum Co. Ltd.

Starch: industrial product, produced by Wuwei Starch Mill of Gansu.

Graphite powder: chemically pure, produced by Xi'an Reagent Factory.

Carboxymethyl cellulose: industrial product, produced by Shanghai Qingdong Chemical Factory.

Directing agent: prepared with the method and conditions provided by CN1081425A, the synthesize ratio is $16SiO_2:Al_2O_3:16Na_2O:320H_2O$ (mole ratio).

The main analytical methods used in the examples are as shown in Table 1:

TABLE 1

The Main Analysis Methods of the Invention

| Item | Method | Standard Code |
|---|---|---|
| NaY's relative crystallinity | X-ray powder diffraction method | Q/SYLS 0596-2002 |
| Ratio of silicon to aluminum of the NaY | X-ray powder diffraction method | Q/SYLS 0573-2002 |
| Particle diameter | Laser granulometer | Q/SYLS 0519-2002 |

The following Examples 1-3 are preparation methods for kaolin sprayed microspheres.

EXAMPLE 1

With reference to FIG. 1, 1500 g of kaolin clay is incorporated with 2% of sodium silicate, 12% of silica sol, 1.4% of sodium hydroxide, 2% of starch, and 2% of carboxymenthyl cellulose, based on the mass of the kaolin. Deionized water is introduced to pulp the resultant into mixed slurry with a kaolin content being 33 wt %. The mixed slurry is sprayed and dried to yield 1,540 g of kaolin sprayed microspheres SM1 with particle sizes of about 20 to 110 μm.

EXAMPLE 2

1500 g of kaolin clay is incorporated with 10% of sodium silicate, 7% of pseudoboehmite, 1.0% of sodium hydroxide, 5% of starch, and 2% of graphite powder, based on the kaolin's mass. Deionized water is introduced to pulp the resultant into mixed slurry with a kaolin content being 40 wt %. The mixed slurry is sprayed and dried to yield 1,610 g of kaolin sprayed microspheres SM2 with particle sizes of about 20 to 110 μm.

EXAMPLE 3

1,500 g of kaolin clay is incorporated with 6% of sodium silicate, 10% of aluminum sol, 1.2% of sodium hydroxide, 3% of graphite powder, 4% of starch, and 2% of carboxymenthyl cellulose (based on the kaolin's mass). Deionized water is introduced to pulp the resultant into mixed slurry with a kaolin content being 47 wt %. The mixed slurry is sprayed and dried to yield 1,532 g of kaolin sprayed microspheres SM3 with particle sizes of about 20 to 110 μm.

The following Examples 4-8 are methods for preparation of kaolin calcined microspheres.

EXAMPLE 4

The SM1 is divided into four parts: the first part is calcined at 930° C. for 2.6 hours to yield high-temperature calcined kaolin microspheres SC1-1; the second part is calcined at 985° C. for 1.5 hours to yield high-temperature calcined kaolin microspheres SC1-2; the third part is calcined at 73° C. for 2.8 hours to yield meta kaolin microspheres SP1-1; and the forth part is calcined at 800° C. for 2.4 hours to yield meta kaolin microspheres SP1-2.

EXAMPLE 5

The SM2 is divided into four parts: the first part is calcined at 920° C. for 2.6 hours to yield high-temperature calcined kaolin microspheres SC2-1; the second part is calcined at 950° C. for 2.3 hours to yield high-temperature calcined kaolin microspheres SC2-2; the third part is calcined at 780° C. for 2.0 hours to yield meta kaolin microspheres SP2-1; and the forth part is calcined at 850° C. for 1.6 hours to yield meta kaolin microspheres SP2-2.

EXAMPLE 6

The SM3 is divided into four parts, the first part is calcined at 960° C. for 2.0 hours to yield high-temperature calcined kaolin microspheres SC3-1; the second part is calcined at 975° C. for 1.6 hours to yield high-temperature calcined kaolin microspheres SC3-2; the third part is calcined at 750° C. for 2.2 hours to yield meta kaolin microspheres SP3-1; and the forth part is calcined at 885° C. for 1.5 hours to yield meta kaolin microspheres SP3-2.

The following Examples 7-9 are preparations of crystallized microspheres with high-content NaY molecular sieves.

EXAMPLE 7

The calcined microspheres (Example 4) prepared with SM1 sprayed microspheres (Example 1) is used as the raw material for the preparation of crystallized microspheres with high-content NaY molecular sieves, and the corresponding conditions and results are shown in Table 2.

EXAMPLE 8

The calcined microspheres (Example 5) prepared with SM2 sprayed microspheres (Example 2) is used as the raw material for the preparation of crystallized microspheres with high-content NaY molecular sieves, and the results are shown in Table 2.

EXAMPLE 9

The calcined microspheres (Example 6) prepared with SM3 sprayed microspheres (Example 3) is used as the raw material for the preparation of crystallized microspheres with high-content NaY molecular sieves, and the results are shown in Table 2.

Figure 2:
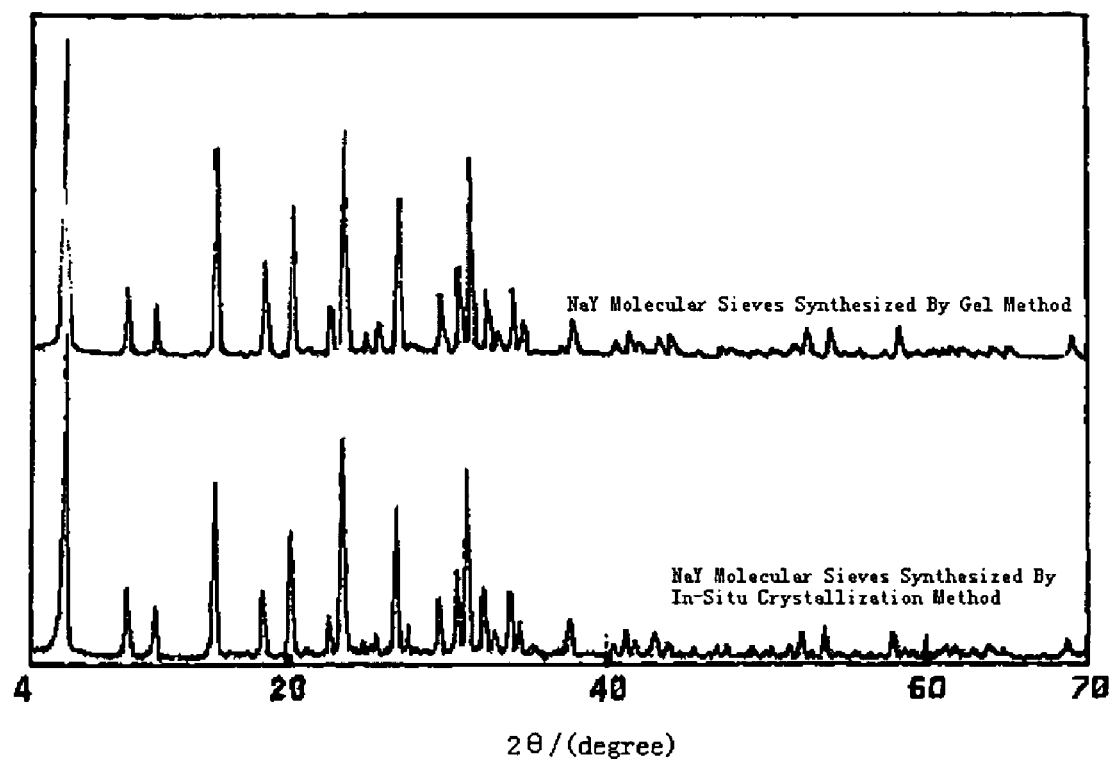
FIG. 2 depicts XRD patterns for two NaY molecular sieves, the crystallized NaY product with a relative crystallinity of 53% and silicon to aluminum ratio being 4.8 prepared by the method of example 9 in the Detailed Description of the Invention below, and NaY molecular sieves synthesized by a gel method provided by example 4 of Peoples Republic of China Document CN1180045A.

By the comparison of the crystallized product with a crystallinity of 53% and silicon-to-aluminum ratio of 4.8 prepared with the method according Example 9 to the NaY molecular sieves synthesized by gel method, FIG. 2 shows that there are similar XRD patterns.

COMPARATIVE EXAMPLE 1

The conventional technology for preparing the sprayed microspheres is used in the present example. Water is added into the kaolin clay with a median diameter of 3.2 μm so as to be pulped into slurry with a solid content of 35 wt %. By spraying, parent microspheres SM4 are obtained. A part of the parent microspheres is calcined in a muffle furnace at 940° C. for 3 hours to obtain high-temperature calcined kaolin microspheres SC4, and the rest is calcined in muffle furnace at 870° C. for 1 hour to yield meta kaolin microspheres SP4. The crystallized microspheres containing NaY molecular sieves are prepared, and the results are shown in Table 2.

COMPARATIVE EXAMPLE 2

The preparation of sprayed microspheres is the same as with Comparative Example 1, except that the calcination conditions for the high-temperature calcined kaolin microspheres are 970° C. and 1.5 hours respectively while the calcination conditions for meta kaolin SP5 are 730° C. and 3 hours. Crystallized microspheres containing NaY molecular sieves are prepared, and the results are shown in Table 2.

The results of the examples and comparative examples show that the crystallized microspheres containing NaY molecular sieves prepared according to the present invention, compared to those prepared by conventional technologies, have advantages that the crystallized product contains significantly more NaY molecular sieves.

TABLE 2

Preparation Results of In-situ Crystallized Microspheres with High-content Molecular Sieves

| | | Example 7 | | Example 8 | | Example 9 | | Comparative example | |
|---|---|---|---|---|---|---|---|---|---|
| | | | | | | | | 1 | 2 |
| | | Sprayed Microsphere No. | | | | | | | |
| | | SM1 | | SM2 | | SM3 | | SM4 | |
| Roasted Microsphere No. | High-Temp. Roasted Microsphere No. | SC1-1 | SC1-2 | SC2-1 | SC2-2 | SC3-1 | SC3-2 | SC4 | SC5 |
| | Meta Kaolin Microsphere No. | SP1-1 | SP1-2 | SP2-1 | SP2-2 | SP3-1 | SP3-2 | SP4 | SP5 |
| High-temp. Roasted Microsphere/Meta Kaolin Microsphere g/g | | 0/100 | 80/20 | 40/60 | 50/50 | 30/70 | 100/0 | 80/20 | 40/60 |
| Water glass, mL | | 650 | 470 | 730 | 365 | 1230 | 876 | 360 | 730 |
| Sodium hydroxide solution, mL | | 345 | 230 | 432 | 284 | 187 | 432 | 130 | 246 |
| Deionized water, mL | | 78 | 85 | 64 | 33 | 135 | 120 | 47 | 123 |
| Guide agent, mL | | 85 | 76 | 94 | 64 | 76 | 83 | 76 | 94 |
| Crystallization time, h | | 28 | 22 | 26 | 24 | 20 | 32 | 22 | 26 |
| Degree of crystallization, %(m/m) | | 59 | 44 | 56 | 48 | 53 | 41 | 25 | 30 |
| Silicon to aluminum ratio, (mol/mol) | | 3.6 | 5.2 | 4.7 | 4.2 | 4.8 | 5.4 | 4.8 | 4.7 |

What is claimed is:

1. A method for preparing high-content NaY molecular sieves synthesized from kaolin sprayed microspheres, comprising:

providing functional components that are structural additives in an amount of about 2 to 10 percent by mass of kaolin, and said structural additives are at least one of starch, graphite powder, and carboxymenthyl cellulose;

adding said functional components and water into kaolin so as to be pulped into a mixed slurry;

spraying and drying said mixed slurry to form kaolin sprayed microspheres;

calcining and mixing said kaolin microspheres with a directing agent to cause crystallization into solid products;

collecting said solid products by filtration and washing said solid products with water; and drying said solid products to obtain a final in-situ crystallized product, said in-situ crystallized product having a content of about 40 to 60 wt % of NaY molecular sieves.

2. The method of claim 1, said water being deionized water.

3. The method of claim 1, said mixed slurry has a solid content of kaolin of about 30 to 50 wt % and said kaolin sprayed microspheres obtained by spraying and drying have particle diameters of about 20 to 110 μm.

4. The method of claim 1, said functional components further comprise a bonding agent and a mineralizer.

5. The method of claim 1, said kaolin includes at least one of soft kaolin, hard kaolin, and coal gangue in the median diameter of about 2.3 to 3.5 μm having more than 80 wt % of crystal kaolin, less than 1.7 wt % of ferric oxide, and less than 0.5 wt % of a combination of sodium oxide and potassium oxide.

6. The method of claim 4, said bonding agent includes at least one of sodium silicate, silica sol, and aluminum sol, a pseudoboehmite and the mixture thereof in an amount of about 5 to 17% based on the mass of said kaolin.

7. The method of claim 4, said mineralizer includes sodium hydroxide in an amount of about 1 to 1.5% based on the mass of said kaolin.

8. The method of claim 1, said directing agent has mole ratios of $(14\text{-}16)SiO_2:(0.7\text{-}1.3)Al_2O_3:(14\text{-}16)Na_2O:(300\text{-}330)H_2O$.

9. The method of claim 1 further comprising:
said kaolin is sprayed into said microspheres, said microspheres then being calcined at a temperature of between about 700 and 1000° C. for about 1 to 3 hours;
adding sodium silicate, a directing agent, sodium hydroxide solution, and deionized water to obtain a solid-liquid mixture;
crystallizing said solid-liquid mixture at a temperature between about 90 and 95° C. for 16 to 36 hours to create resultant solid products;
filtrating said solid-liquid mixture to remove liquid to leave said resultant solid products;
washing said solid products with deionized water until a pH level of less than 10.5 is achieved; and
drying said solid products to obtain a final in-situ crystallized product of kaolin sprayed microspheres containing about 40 to 60% of NaY molecular sieve.

10. The method of claim 1 further comprising:
a first part of said kaolin sprayed microspheres being calcined at a temperature of between about 920 and 1000° C. for about 1 to 3 hours to yield high-temperature calcined kaolin sprayed microspheres, a second part of said kaolin sprayed microspheres being calcined at a temperature of between about 700 and 900° C. for about 1 to 3 hours to yield meta kaolin sprayed microspheres;
mixing said first part of kaolin sprayed microspheres and said second part of kaolin sprayed microspheres;
adding sodium silicate, a directing agent, sodium hydroxide solution and deionized water to obtain a solid-liquid mixture;
crystallizing said solid-liquid mixture at a temperature of between about 90 and 95° C. for about 16 to 36 hours to create resultant solid products;
filtrating said solid-liquid mixture to remove liquid to leave said resultant solid products;
washing said resultant solid products with deionized water until a pH level of less than 10.5 is achieved; and
drying said resultant solid products to obtain a final in-situ crystallized product of kaolin sprayed microspheres containing about 40 to 60% of NaY molecular sieves having a ratio of silicate to aluminum of about 3.5 to 5.5.

11. The method of claim 9, said directing agent having mole ratios of $(14\text{-}16)SiO_2:(0.7\text{-}1.3)Al_2O_3:(14\text{-}16)Na_2O:(300\text{-}330)H_2O$.

12. The method of claim 10, said directing agent having mole ratios of $(14\text{-}16)SiO_2:(0.7\text{-}1.3)Al_2O_3:(14\text{-}16)Na_2O:(300\text{-}330)H_2O$.

13. A method for preparing high-content NaY molecular sieves synthesized from kaolin sprayed microspheres, comprising:
providing functional components that are structural additives;
adding said functional components and water into kaolin so as to be pulped into a mixed slurry;
spraying and drying said mixed slurry to form kaolin sprayed microspheres;
calcining and mixing said kaolin microspheres with a directing agent to cause crystallization into solid products;
collecting said solid products by filtration and washing said solid products with water; and drying said solid products to obtain a final in-situ crystallized product, said in-situ crystallized product having a content of about 40 to 60 wt % of NaY molecular sieves.

14. The method of claim 13, said water being deionized water.

15. The method of claim 13, said functional components being in an amount of about 2 to 10 percent by mass of kaolin.

16. The method of claim 13, said structural additives being at least one of starch, graphite powder, and carboxymenthyl cellulose.

17. The method of claim 13, said mixed slurry has a solid content of kaolin of about 30 to 50 wt % and said kaolin sprayed microspheres obtained by spraying and drying have particle diameters of about 20 to 110 μm.

18. The method of claim 13, said functional components further comprise a bonding agent and a mineralizer.

19. The method of claim 13, said kaolin includes at least one of soft kaolin, hard kaolin, and coal gangue in the median diameter of about 2.3 to 3.5 μm having more than 80 wt % of crystal kaolin, less than 1.7 wt % of ferric oxide, and less than 0.5 wt % of a combination of sodium oxide and potassium oxide.

20. The method of claim 17, said bonding agent includes at least one of sodium silicate, silica sol, and aluminum sol, a pseudoboehmite and the mixture thereof in an amount of about 5 to 17% based on the mass of said kaolin.

21. The method of claim 18 said mineralizer includes sodium hydroxide in an amount of about 1 to 1.5% based on the mass of said kaolin.

22. The method of claim 13, said directing agent has mole ratios of $(14\text{-}16)SiO_2:(0.7\text{-}1.3)Al_2O_3:(14\text{-}16)Na_2O:(300\text{-}330)H_2O$.

23. The method of claim 13 further comprising:
said kaolin is sprayed into said microspheres, said microspheres then being calcined at a temperature of between about 700 and 1000° C. for about 1 to 3 hours;
adding sodium silicate, a directing agent, sodium hydroxide solution, and deionized water to obtain a solid-liquid mixture;
crystallizing said solid-liquid mixture at a temperature between about 90 and 95° C. for 16 to 36 hours to create resultant solid products;
filtrating said solid-liquid mixture to remove liquid to leave said resultant solid products;
washing said solid products with deionized water until a pH level of less than 10.5 is achieved; and
drying said solid products to obtain a final in-situ crystallized product of kaolin sprayed microspheres containing about 40 to 60% of NaY molecular sieve.

24. The method of claim 13 further comprising:

a first part of said kaolin sprayed microspheres being calcined at a temperature of between about 920 and 1000° C. for about 1 to 3 hours to yield high-temperature calcined kaolin sprayed microspheres, a second part of said kaolin sprayed microspheres being calcined at a temperature of between about 700 and 900° C. for about 1 to 3 hours to yield meta kaolin sprayed microspheres;

mixing said first part of kaolin sprayed microspheres and said second part of kaolin sprayed microspheres;

adding sodium silicate, a directing agent, sodium hydroxide solution and deionized water to obtain a solid-liquid mixture;

crystallizing said solid-liquid mixture at a temperature of between about 90 and 95° C. for about 16 to 36 hours to create resultant solid products;

filtrating said solid-liquid mixture to remove liquid to leave said resultant solid products;

washing said resultant solid products with deionized water until a pH level of less than 10.5 is achieved; and drying said resultant solid products to obtain a final in-situ crystallized product of kaolin sprayed microspheres containing about 40 to 60% of NaY molecular sieves having a ratio of silicate to aluminum of about 3.5 to 5.5.

25. The method of claim 23, said directing agent having mole ratios of $(14\text{-}16)SiO_2:(0.7\text{-}1.3)Al_2O_3:(14\text{-}16)Na_2O:(300\text{-}330)H_2O$.

26. The method of claim 24, said directing agent having mole ratios of $(14\text{-}16)SiO_2:(0.7\text{-}1.3)Al_2O_3:(14\text{-}16)Na_2O:(300\text{-}330)H_2O$.

* * * * *